Patented Dec. 26, 1933

1,941,120

UNITED STATES PATENT OFFICE 1,941,120

MANUFACTURE OF GOODS OF RUBBER OR SIMILAR MATERIAL

Douglas Frank Twiss and Edward Arthur Murphy, Wylde Green, England, assignors to Dunlop Rubber Company Limited, Birmingham, England, a British corporation No Drawing. Application May 31, 1930, Serial No. 458,931, and in Great Britain June 18, 1929

3 Claims. (Cl. 91—68)

This invention relates to improvements in or relating to the manufacture of goods of rubber or similar material from aqueous emulsions or dispersions, and more particularly to the manufacture of shaped cellulosic articles coated and/or impregnated with rubber or similar material of sponge-like or cellular structure.

It is the object of this invention to manufacture shaped articles of cellulosic or other fibrous material coated and/or impregnated with rubber or similar material of sponge-like or cellular structure, as for example, sponge rubber shoe socks, by coating cellulosic material such as fabric or thick paper previously fashioned into the desired shape, for instance, into that of a shoe sock, with froth or foam of the dispersions hereinafter specified and subsequently setting the coatings thereon.

Any suitable froth or foam of a dispersion of rubber material may be employed. The dispersions of a rubber-like material having a frothing constituent such as saponin or a soap or alkali salt of oleic acid or other soap forming acid and a gelling constituent such as ammonium oleate or sodium or potassium silicofluoride or ammonium persulphate as described in Patent 1,852,447, April 5, 1932, may be employed, and the methods for forming such dispersions and froths or foams described in said application may be employed.

As described in said application a gelling constituent capable of forming a reversible gell and one that does not inhibit or break down the frothing characteristics of the emulsion or dispersion should be employed. The foam is formed by whipping such a dispersion into a froth, or if a coarser foam is desired, by also blowing air through the dispersion.

Any suitable emulsion or dispersion of a rubber or rubber-like material may be employed. For example, a dispersion containing a rubber material, gutta-percha, balata or similar vegetable resins, occurring naturally or artificially obtained, and in vulcanized or unvulcanized condition. Aqueous dispersions of coagulated rubber, vulcanized rubber, waste or reclaim may also be employed if desired as alternatives or admixtures. Any of the aforesaid dispersions may contain the usual known compounding ingredients and/or may be in concentrated form.

Concentrates such as are obtained in Patent 1,846,164, February 23, 1932, to which may be added any one or more of the usual compounding ingredients, preferably excepting those which would tend to lead to increase of the surface tension of the foamy mass, may also be used as indicated, Patent 1,852,447.

The following example illustrates how the process can be effected:

A latex mixing which is to give a transparent product of the type described and claimed in Patent 1,797,250, March 24, 1931 in the form of a latex concentrate and having the following composition,—

| | |
|---|---|
| Rubber | 92 parts by weight |
| Sulphur | 2 parts by weight |
| Zinc diethyldithiocarbamate | 0.5 parts by weight |
| Mineral oil | 5 parts by weight | is prepared in the presence of 0.3 parts by weight of caustic potash and 0.5 parts by weight of oleic acid as described in Patent 1,846,164. To the cold cream 0.5 parts of potassium oleate and 1 part of sodium silicofluoride on the dry mix are added and the mixture is whipped into a stiff froth in any suitable manner, for example, by means of an egg-whipping attachment of a cake-mixing machine. Should a large cell structure be desired, air or other gas may be blown gently over the surface of the cream or bubbled through it during the frothing operation. Into the foam produced is dipped fabric or thick paper cut into the shape of a sock and the foam is allowed to set thereon in the cold. The coated sock is then transferred to an air oven and allowed to cure and dry. Alternatively, the coated sock may be subjected to a dehydrating and setting agent, such as sodium chloride, ammonium acetate or calcium chloride according to application Serial No. 309,353, filed September 20, 1928.

A further alternative is to treat cellulosic or fibrous material with latex coagulants or acid latex, prior to coating the cellulosic or fibrous materials with foam, the object being to improve the setting of the foam deposit. This preliminary treatment of the cellulosic or fibrous foundation with latex coagulants or acid latex also serves the purpose of assisting in preventing any perforations in the said foundation from being chocked by the foam deposit, while ensuring stoutness of foam deposit up to the edges of the material.

The cellulosic or other fibrous materials if desired, may be stiffened and/or rendered waterproof in known manner prior to being coated with the aqueous dispersions aforesaid.

Owing to the presence of the layer of cellulosic or other fibrous material socks and such like articles obtained in accordance with the present invention during use do not become distorted or wrinkled.

The invention is a more economical process for the production of shoe socks and the like than is obtained when the socks are stamped out from sponge sheet as the present invention avoids waste of any sponge rubber due to the stamping process. It also provides an article with the cellulosic or fibrous layer completely enclosed and protected by rubber.

Having now particularly described and ascertained the nature of our said invention and in what manner the same is to be performed, we declare that what we claim is:

1. A method of forming shoe socks which comprises dipping a fibrous structure of substantially the shape and size of the shoe sock to be made into a foamed aqueous dispersion of rubber material to enclose the surface and edges of said structure completely in said foam, and setting and drying the resulting structure.

2. A shoe sock comprising a fibrous structure of substantially the size and shape of the shoe sock and a layer of rubber foam entirely covering the surface and edges of said structure and enclosing the latter.

3. The method of claim 1 in which the foam is set by gelling.

DOUGLAS FRANK TWISS.
EDWARD ARTHUR MURPHY.